United States Patent
Koh et al.

(10) Patent No.: US 11,414,333 B2
(45) Date of Patent: *Aug. 16, 2022

(54) AUTOMATED WASTE WATER RECYCLING SYSTEM USING ADVANCED ELECTRO-COAGULATION UNIT

(71) Applicants: GREEN TECH CORPORATION, Paramount, CA (US); CONFIDENT ENGINEERING INDIA PRIVATE LIMITED, Coimbatore (IN)

(72) Inventors: Myung Koh, Paramount, CA (US); Rathna Kumar Chidambaranathan, Coimbatore (IN)

(73) Assignees: GREEN TECH CORPORATION, Paramount, CA (US); CONFIDENT ENGINEERING INDIA PRIVATE LIMITED, Coimbatore (IN)

( * ) Notice: Subject to any disclaimer, the term of this patent is extended or adjusted under 35 U.S.C. 154(b) by 289 days.

This patent is subject to a terminal disclaimer.

(21) Appl. No.: 16/583,181

(22) Filed: Sep. 25, 2019

(65) Prior Publication Data

US 2020/0095149 A1   Mar. 26, 2020

Related U.S. Application Data

(60) Provisional application No. 62/799,657, filed on Jan. 31, 2019, provisional application No. 62/736,265, filed on Sep. 25, 2018.

(51) Int. Cl.
*C02F 9/00* (2006.01)
*C02F 1/00* (2006.01)
(Continued)

(52) U.S. Cl.
CPC ............... *C02F 9/00* (2013.01); *B01D 21/01* (2013.01); *B01D 21/245* (2013.01);
(Continued)

(58) Field of Classification Search
CPC ........ B01D 2311/04; B01D 2311/2649; B01D 2311/2642; B01D 21/0006;
(Continued)

(56) References Cited

U.S. PATENT DOCUMENTS

| | | | |
|---|---|---|---|
| 2009/0107915 A1* | 4/2009 | Skinner ................ | C02F 9/00 210/636 |
| 2010/0051542 A1* | 3/2010 | Elektorowicz ........ | C02F 1/463 210/631 |
| 2018/0009681 A1* | 1/2018 | Cam ..................... | C02F 9/00 |

* cited by examiner

*Primary Examiner* — Dirk R Bass
(74) *Attorney, Agent, or Firm* — Heedong Chae; Lucem, PC

(57) ABSTRACT

An automated waste water treatment system includes a collection tank constructed to hold waste water, a first flow line connected to the collection tank to output the waste water from the collection tank, an electrocoagulation unit that receives the waste water and outputs the waste water as coagulated waste water to a flow line, a polymer dosage tank to provide a polymer dosage into the flow line where the polymer dosage mixes with the coagulated waste water to produce and output flocculated waste water. A clarifier connected to the flow line receives the flocculated waste water and produces sludge-free waste water and concentrated sludge, a series of filters to output filter-treated water, and an ultrafiltration system that receives filter-treated water and outputs ultrafiltration-treated water to a reverse osmosis system.

15 Claims, 9 Drawing Sheets

(51) Int. Cl.
 B01D 25/12 (2006.01)
 B01D 24/10 (2006.01)
 B01D 61/02 (2006.01)
 B01D 61/08 (2006.01)
 B01D 61/14 (2006.01)
 B01D 61/18 (2006.01)
 B01D 61/58 (2006.01)
 B01D 21/01 (2006.01)
 B01D 21/30 (2006.01)
 B01D 21/24 (2006.01)
 B01D 24/46 (2006.01)
 C02F 1/463 (2006.01)
 C02F 1/56 (2006.01)
 C02F 1/28 (2006.01)
 C02F 1/44 (2006.01)
 C02F 1/66 (2006.01)
 C02F 1/461 (2006.01)
 C02F 101/20 (2006.01)
 C02F 11/122 (2019.01)

(52) U.S. Cl.
 CPC ........... *B01D 21/302* (2013.01); *B01D 24/10* (2013.01); *B01D 24/4636* (2013.01); *B01D 25/12* (2013.01); *B01D 61/022* (2013.01); *B01D 61/025* (2013.01); *B01D 61/08* (2013.01); *B01D 61/145* (2013.01); *B01D 61/18* (2013.01); *B01D 61/58* (2013.01); *C02F 1/008* (2013.01); *B01D 2311/12* (2013.01); *B01D 2311/18* (2013.01); *B01D 2311/2626* (2013.01); *B01D 2311/2642* (2013.01); *B01D 2311/2649* (2013.01); *B01D 2311/2661* (2013.01); *B01D 2311/2684* (2013.01); *B01D 2317/025* (2013.01); *C02F 1/004* (2013.01); *C02F 1/283* (2013.01); *C02F 1/441* (2013.01); *C02F 1/444* (2013.01); *C02F 1/463* (2013.01); *C02F 1/46104* (2013.01); *C02F 1/56* (2013.01); *C02F 1/66* (2013.01); *C02F 11/122* (2013.01); *C02F 2001/007* (2013.01); *C02F 2001/46119* (2013.01); *C02F 2101/203* (2013.01); *C02F 2201/005* (2013.01); *C02F 2201/46145* (2013.01); *C02F 2209/06* (2013.01); *C02F 2209/40* (2013.01); *C02F 2301/046* (2013.01); *C02F 2303/14* (2013.01); *C02F 2303/16* (2013.01)

(58) Field of Classification Search
 CPC .. B01D 21/0009; B01D 21/01; B01D 21/245; B01D 21/302; B01D 2311/12; B01D 2311/18; B01D 2311/2626; B01D 2311/2661; B01D 2311/2684; B01D 2317/025; B01D 24/10; B01D 24/4636; B01D 25/12; B01D 61/022; B01D 61/025; B01D 61/04; B01D 61/08; B01D 61/145; B01D 61/18; B01D 61/58; B03D 1/02; B03D 1/1431; B03D 3/02; B03D 3/06; C02F 11/122; C02F 1/004; C02F 1/008; C02F 1/283; C02F 1/441; C02F 1/444; C02F 1/46104; C02F 1/463; C02F 1/56; C02F 1/66; C02F 2001/007; C02F 2001/46119; C02F 2101/203; C02F 2201/005; C02F 2201/4612; C02F 2201/46145; C02F 2209/06; C02F 2209/40; C02F 2301/046; C02F 2301/08; C02F 2303/14; C02F 2303/16; C02F 9/00
 See application file for complete search history.

AUTOMATED WASTE WATER RECYCLING SYSTEM USING ADVANCED ELECTRO-COAGULATION UNIT

CROSS-REFERENCE TO RELATED APPLICATIONS

This application claims priority to U.S. provisional patent application No. 62/736,265, filed on Sep. 25, 2018, and U.S. provisional patent application No. 62/799,657, filed on Jan. 31, 2019, the disclosures of which are incorporated herein by reference in their entirety.

FIELD OF INVENTION

Embodiments of this disclosure generally relate to waste water treatment, more particularly, to an automated waste water recycling system using advanced electro-coagulation unit.

BACKGROUND OF THE INVENTION

The term "waste water" is commonly used to refer to any of the numerous aqueous streams containing pollutants and contaminants that arise in industrial and other contexts. Such waste waters are also referred to as effluent. Some of the engineering and process industries effluents (waste water) that can be treated in the method, device, systems and processes according to the invention include, but are not limited to, the following industries or commercial sectors: textile processing, dyeing, chemical, finishing, leather, pharmaceuticals, cement, diary, food processing, slaughter house, beverages, distilleries, papers, steel manufacturing, electroplating, oil & gas, nuclear (uranium waste water), mining, coal, washing (textiles, machines, etc.), semiconductor sector, abattoirs, hotels, hospitals, restaurants, granite & marble processing, and other industries using huge amount of water. Said term "waste water" is also used in the domestic and municipal context where different water streams arise such as, for example, drinking water supply, sewage, grey water, etc. The term is also used to refer seawater, brackish water, and similar water bodies or sources.

Wastewater treatment is a process used to convert influent wastewater into an effluent treated water (outflowing of water to a receiving body of water) that can be returned to the water cycle with minimal impact on the environment or directly reused. The latter is called water reclamation because treated wastewater can then be used for other purposes. The treatment process takes place in a wastewater treatment plant (WWTP), often referred to as a Water Resource Recovery Facility (WRRF) or a Sewage/Effluent treatment plant. Pollutants in municipal wastewater (households and small industries) can be removed or broken down to levels that allow the treated/reclaimed wastewater to be used safely for other purposes as needed.

A relative degree of success in purifying such waste waters can be achieved by passing bubbles of gases through a large tank containing industrial wastewater, whereby rising gas bubbles, having a laminar flow through the tank, occlude or become attached to some of the particulate matter. Thus, treated particles tend to be less dense than water and accordingly rise to near the surface of the liquid within the tank where they can be skimmed off. Oftentimes these processes are combined with various chemical treatments. Even so, such techniques have their drawbacks as they are prone to be time consuming, inconvenient, and relatively inefficient while requiring large environmental footprints. Generally, methods and apparatus employing such techniques cannot economically treat wastewater as quickly and efficiently as it is generated in a large scale industrial process so as to satisfactorily remove pollutants therein.

Electro-coagulation treatment devices are also referred to as electro coagulators, electro coagulating reactors, EC reactors, ECRs, electrolysis and by several other expressions. Electro-coagulation is analogous to chemical coagulation. Chemical coagulating materials are added to the waste water to separate out suspended, colloidal and emulsified matter contained therein. Chemical coagulants, coagulants for short, destabilize suspensions, colloids and emulsions by neutralizing their charges. The destabilized solid matter from the suspensions and colloids agglomerates and precipitates out. In case of emulsions the contaminant liquid coalesces and forms a separate fluid phase which is the separated out.

If flocculants have also been added, or if the coagulants themselves form flocculates, the said solid matter is trapped in the flocculation and rises to the water surface. It is then removed by skimming or other known separation means. Floatation agents are also sometimes used. The resulting contaminant liquid phase formed when an emulsion is destabilized is removed by decantation or other known separation processes.

Generally speaking, EC is more versatile than chemical coagulation in the range of said waste water than can be handled, in the range of reactions for contaminant removal that can be carried out therein and, in the extent, in the comprehensiveness of contaminant removal. A disadvantage of the chemical method is that the un-reacted chemical coagulants themselves constitute contaminants and introduce secondary pollution. Also, remnants from the reactions involving the coagulants and other additives also generate secondary pollution. They may also contain impurities that contaminate the waste water stream being processed.

Thus, there remains a need for an automated waste water recycling system for treating and recycling waste water with improved efficiency without the aforementioned drawbacks.

SUMMARY OF THE INVENTION

To solve the problems described above, an object of the present invention is to provide an automated waste water treatment system that includes a collection tank constructed to hold waste water, a first flow line connected to the collection tank to output the waste water from the collection tank, an electrocoagulation unit connected to the first flow line to receive the waste water and to output the waste water as coagulated waste water into a second flow line, a polymer dosage tank to provide a polymer dosage into the second flow line wherein the polymer dosage mixes with the coagulated waste water to produce and output flocculated waste water, a clarifier connected to the second flow line to receive the flocculated waste water and to produce sludge-free waste water and concentrated sludge, a filter feed tank to receive the sludge-free water from the clarifier, a filter press to produce treated water from the concentrated sludge, a pressure sand filter constructed to receive the sludge-free waste water and the treated water and outputs to a activated carbon filter and/or iron removal filter (CIRF), and an ultrafiltration system that receives CIRF-filtered water and outputs ultrafiltration-treated water to a reverse osmosis system. A first inlet valve regulates the waste water flowing into the electrocoagulation unit. The electrocoagulation unit includes a nonconductive outer shell having an interior space, a control unit electrically connected to the electrocoagulation unit, an electrocoagulation feed line connected to the first flow line. The electrocoagulation feed line includes a plurality of electrocoagulation feed pipes connected to a bottom surface of the nonconductive outer shell of the electrocoagulation unit to feed the waste water received from the first flow line into a lower portion of the interior space of the electrocoagulation unit. The electrocoagulation unit further includes an air grid controlled by the control unit and an electrode assembly placed substantially within the nonconductive outer shell, the electrode assembly including a plurality of electrodes exposed to an upward flow of the waste water from the lower portion of the interior space, a plurality of holders to hold the plurality of electrodes, and an electrode lifting arrangement on a top edge of each of the plurality of electrodes. The plurality of electrocoagulation feed pipes are spaced with respect to each other to allow the waste water to enter the lower portion of the interior space of the electrocoagulation unit evenly, and the air grid purges waste material from the plurality of electrodes.

Another object of the present invention is to provide an electrocoagulation unit for use in an automated waste water treatment system, wherein the automated waste water treatment system includes a control unit, a collection tank that holds waste water, a first flow line connected to the collection tank and to the electrocoagulation unit, a clarifier, a polymer dosage tank, a filter feed tank, a pressure sand filter (PSF), an activated carbon filter and/or iron removal filter (CIRF), an ultrafiltration (UF) system, and a reverse osmosis (RO) system, the electrocoagulation unit including a nonconductive outer shell having an interior space, an electrocoagulation feed line connected to the first flow line, the electrocoagulation feed line including a plurality of electrocoagulation feed pipes connected to a bottom surface of the nonconductive outer shell to feed the waste water received from the first flow line into a lower portion of the interior space, an air grid controlled by the control unit, and an electrode assembly placed substantially within the nonconductive outer shell. The electrocoagulation unit is connected to the first flow line to receive the waste water and to output the waste water as coagulated waste water. The electrode assembly includes a plurality of electrodes exposed to an upward flow of the waste water, a plurality of holders constructed to hold the plurality of electrodes, and an electrode lifting arrangement placed on a top edge of each of the plurality of electrodes, wherein the plurality of electrodes comprises a plurality of anodes and a plurality of cathodes. The air grid of the electrocoagulation unit purges waste material from the plurality of electrodes to extend the plurality of electrodes' working lifespan and to ensure that active electrocoagulation on the electrode assembly remains efficient.

Still another object of the present invention is to provide a pressure sand filter for filtering sludge-free waste water to produce sand-filtered water for an automated waste water treatment system, wherein the automated waste water treatment system includes a control unit, a collection tank that holds waste water, a first flow line connected to the collection tank and to an electrocoagulation unit, a clarifier, a polymer dosage tank, a filter feed tank, an activated carbon filter and/or iron removal filter (CIRF), an ultrafiltration system, and a reverse osmosis (RO) system, the pressure sand filter including an external shell having an internal region constructed to hold sand of varying grain size, a receiving adapter constructed on an upper region of the external shell such that the receiving adapter connects the third flow line to the pressure sand filter, a pressure sand filter-backwash pump located at a lower region of the external shell to backwash sand filtered water from a lower internal region of the external shell to an upper internal region of the external shell to purge obstructive material from the pressure sand filter. The sand is biased from a large grain size at the upper internal region of the external shell to a lower grain size towards the lower internal region of the external shell.

The advantages of the present invention are: (1) improvement of the efficiency of waste water treatment where the automated waste water treatment system produces a 97% recovery of pure reusable water from waste water; (2) increase the convenience of maintaining the electrodes through the use of electrode holders constructed on a top edge of the electrode where a hoist can remove the electrode from the electrocoagulation unit for maintenance, repair, or replacement; (3) increased longevity of the electrodes used in the electrocoagulation of waste water through removal of solids trapped on the surface of the electrodes by employing an air filter grid to physically agitate the solids that adhere to the electrodes and an acid wash, the latter involving the charging of an acid solution, wherein the acid that is spent can be advantageously utilized, into the waste water to be treated—the ferrous chloride in the spent solution reacts to form the hydroxides (hydroxides being coagulating agents that coagulate/coalesce colloidal suspensions and emulsions) wherein the formation of hydroxide commences in the collection tank and continues in the EC unit such that this automated system provides another novel utilization of an inconvenient waste product/stream whereby the utilization of the ferrous/ferric chlorides reduces the requirement of the consumable electrodes in the EC unit (yet another advantage of the automated system); (4) increased efficiency of the electrodes used in the electrocoagulation of the waste water where turbulence of waste water inflows is minimized by equally spaced electrocoagulation feed pipes that allow even and steady flow of waste water into the electrocoagulation unit and an even and steady rise of the waste water level thereof; (5) electrocoagulation reactions continue seamlessly from the collection tank, through the first flow line and in the device (or any other ECR that may be used) wherein the automated system automatically disposes/drains the spent acid and the associated sludge after the acid cleaning process; (6) a clarifier constructed to allow additional recycling of sludge for further extraction of reusable water from waste water inflows following electrocoagulation and flocculation; (7) improved longevity and efficiency of various filters, particularly the pressure sand filter, via backwash of filtered water through the filter; and (8) lowering the environmental footprint for an automatic waste water treatment system.

Although the present invention is briefly summarized, a fuller understanding of the invention can be obtained by the following drawings, detailed description and appended claims.

BRIEF DESCRIPTION OF THE DRAWINGS

The embodiments herein will be better understood from the following detailed description with reference to the drawings, in which.

DETAILED DESCRIPTION OF THE EMBODIMENTS OF THE INVENTION

Figure 1:
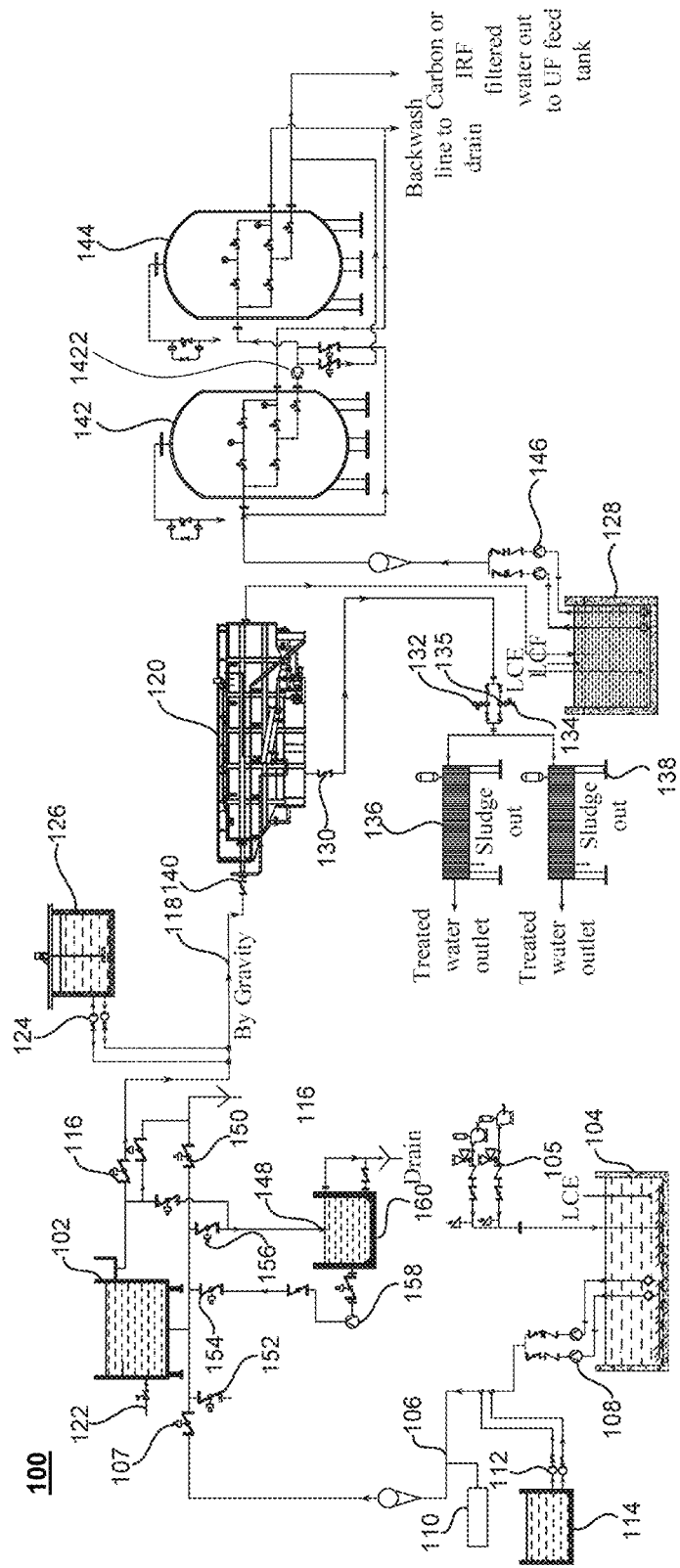
FIG. 1 illustrates a system view of an automated waste water recycling system comprising an electrocoagulation unit, a clarifier and, a pressure sand filter and activated carbon filter and/or iron removal filter according to an embodiment herein.

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

As mentioned, there remains a need for an automated waste water recycling system for treating and recycling waste water with improved efficiency. Referring now to the drawings, and more particularly to FIGS. 1 through 6B, where similar reference characters denote corresponding features consistently throughout the figures, there are shown preferred embodiments.

FIG. 1 illustrates a system view of an automated waste water recycling system comprising an electrocoagulation (EC) unit (102), a clarifier (120) and, a pressure sand filter (142) and activated carbon filter and/or iron removal filter (144) according to the embodiment herein. The electrocoagulation (EC) unit (102) is connected to a collection tank (104) through a first flow line (106) for receiving waste water.

Figure 2A:
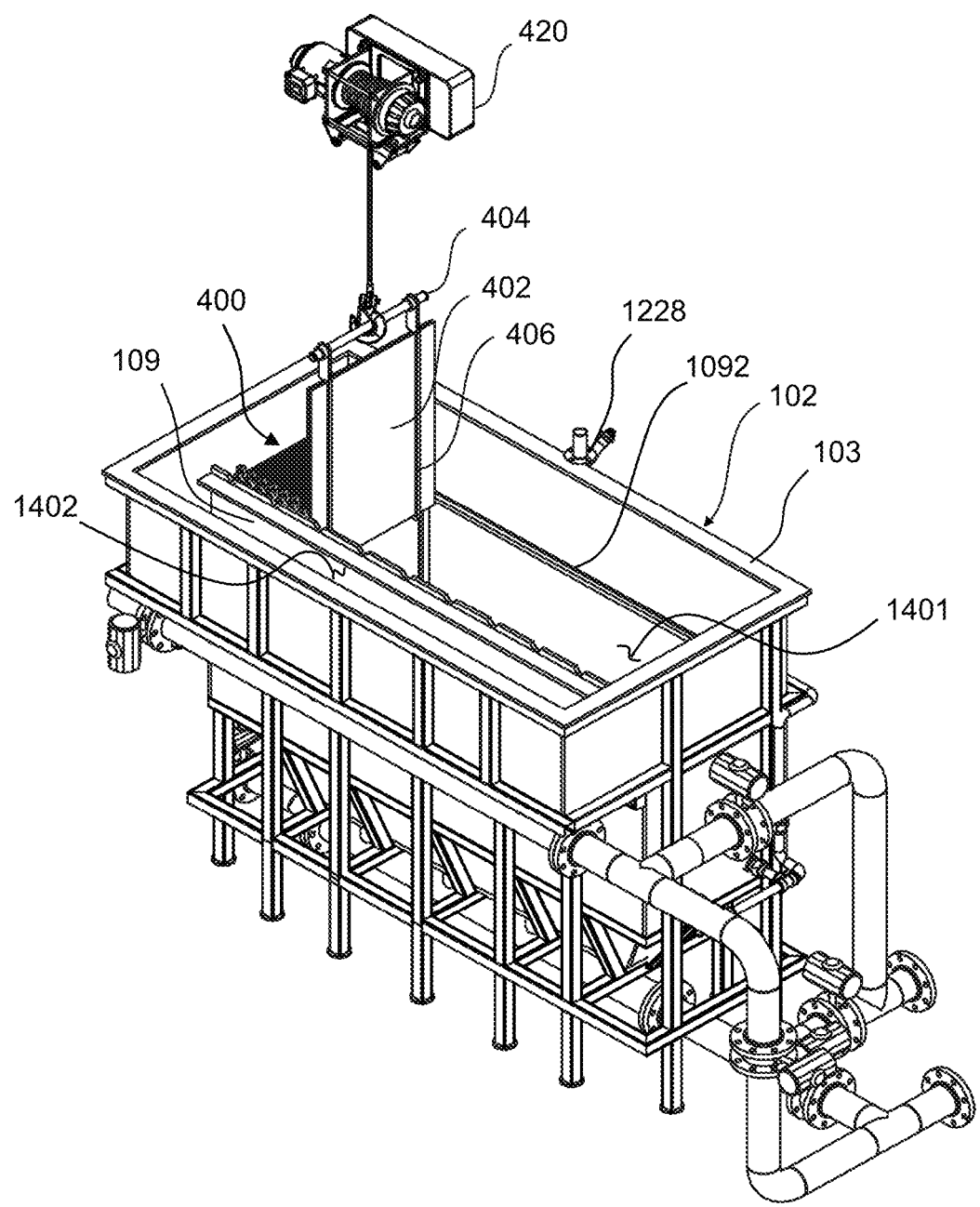
FIG. 2A illustrates a perspective view of the electrocoagulation unit of the automated waste water recycling system of FIG. 1.
Figure 2B:
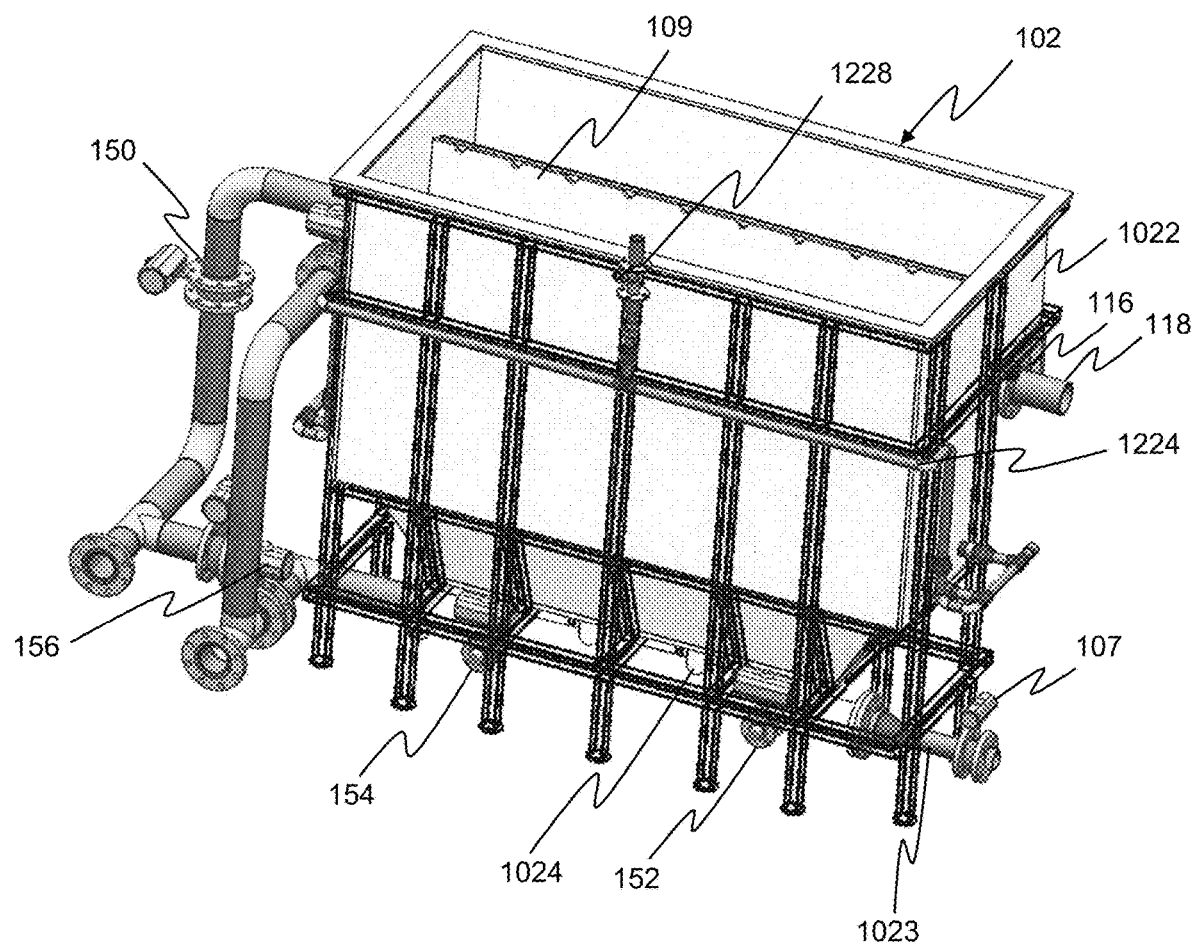
FIG. 2B illustrates a perspective view of the electrocoagulation unit of the automated waste water recycling system of FIG. 1.
Figure 2C:
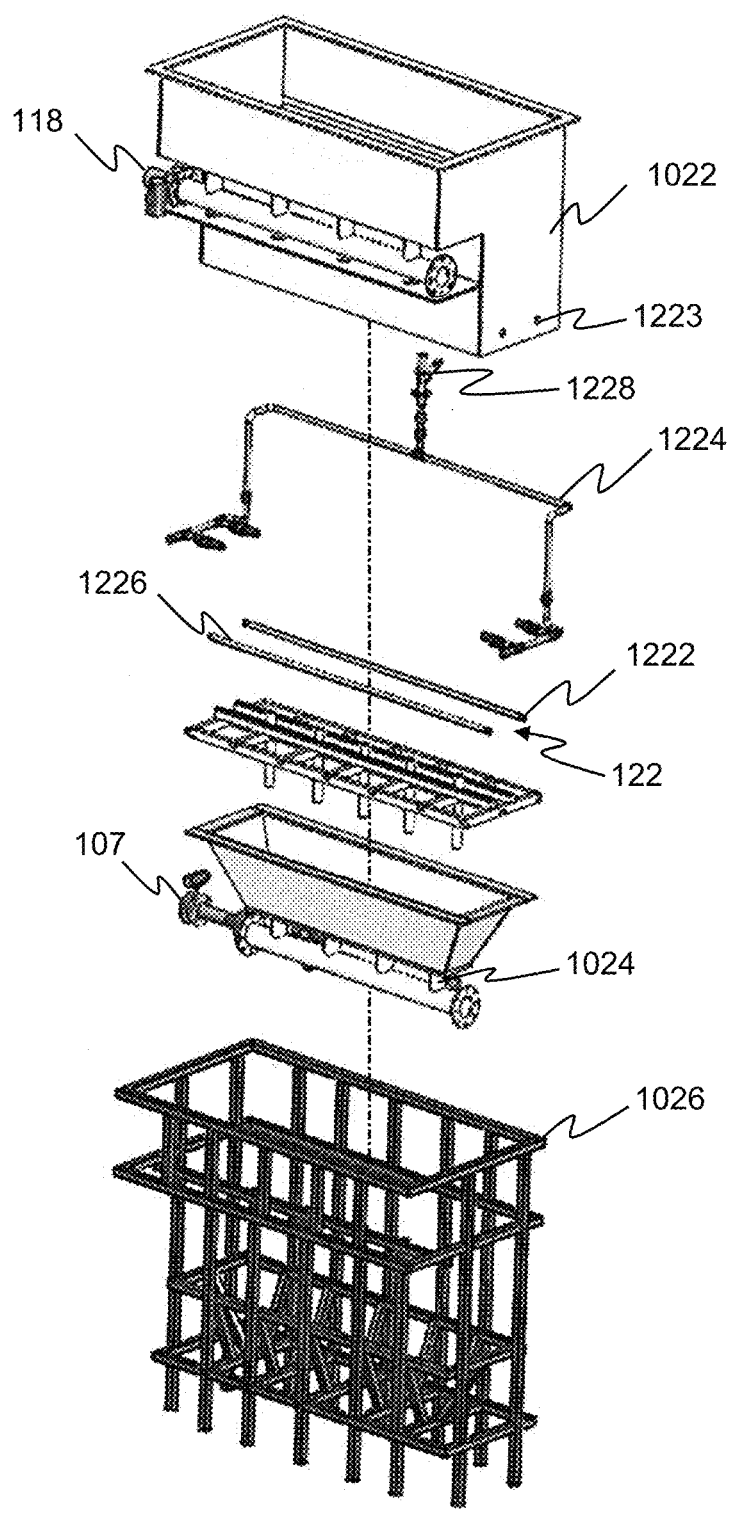
FIG. 2C illustrates an exploded view of the electrocoagulation unit of the automated waste water recycling system of FIG. 1.

As shown in FIGS. 2A-C, the electrocoagulation unit (102) includes a nonconductive outer shell (1022) having an interior space and a top rim (103) (the nonconductive shell may further include a support frame structure (1026) for structural support), an electrocoagulation feed line (1023) connected to the first flow line (106), a plurality of electrocoagulation feed pipes (1024), an air grid (122), a first inlet valve (107) connecting the first flow line (106) to the electrocoagulation feed line (1023), a partition wall (109) in the interior space of the nonconductive outer shell (1022), a second flow line (118), a first outlet valve (116), and an electrode assembly (400).

The partition wall (109) is constructed in the interior space of the nonconductive outer shell (1022) such that the partition wall (109) divides the interior space of the nonconductive outer shell (1022) into an electrode chamber (1401) and an outlet chamber (1402). The partition wall (109) includes a top edge constructed at a height below the top rim (103) of the nonconductive outer shell (1022) and extends to a base of the nonconductive outer shell (1022). The electrode assembly (400), placed substantially within the electrode chamber (1401), includes a plurality of electrodes (402) that are vertically arranged in parallel and are closely spaced to each other with a small gap between the them (402) wherein the plurality of electrodes (402) span substantially across from one end of the electrocoagulation unit (102) to an opposite end of the electrocoagulation unit (102), a plurality of holders (406) that hold the plurality of electrodes (402) in place, and an electrode lifting arrangement (404) constructed on a top edge of each electrode. The electrode assembly (400) is placed substantially within the electrode chamber (1401) by the electrode lifting arrangement (404), the electrode lifting arrangement (404) having a first end and a second end, wherein the first end is placed atop the top edge of the partition wall (109) and the second end is placed atop of a holding rail (1092) that protrudes from a side of the electrode chamber (1401) that faces opposite to the partition wall (109). Since the partition wall (109) sits below the top rim (103) of the nonconductive outer shell (1022), coagulated waste water passively spills over the top edge of the partition wall (109) from the electrode chamber (1401) to the outlet chamber (1402).

In one embodiment, the nonconductive outer shell (1022) is made up of polypropylene material. In another embodiment, the plurality of electrodes (402) may include ferrous/iron/aluminium plates. The waste water flows between the plurality of electrodes (402) from a bottom of the electrode assembly (400) to a top of the electrode assembly (400). The plurality of electrodes (402) includes a plurality of anodes and a plurality of cathodes and a plurality of holders (406) that tightly holds the plurality of electrodes (402). As shown in FIG. 1, the automated system comprises the first inlet valve (107) that is connected to the first flow line (106) that feeds the waste water into the electrocoagulation unit (102) and a control unit that is electrically connected to the electrocoagulation unit (102). The first inlet valve (107) may be a ball valve or butterfly valve controlled by solenoid valve or any electronic valve or pneumatic actuator. The control unit is thyristor-based and may be connected to one or more central processing units (CPU), one or more display units, memory storing one or more programs. The control unit is configured to activate an electrocoagulation feed pump (108) to pump the waste water through the first flow line (106) from the collection tank (104) to the electrocoagulation unit (102) at a first flow rate ranging from 0.1 $m^3$/hour to 200 $m^3$/hour. The control unit gradually increases the first flow rate by increasing a speed of the electrocoagulation feed pump (108). Once the desired flow rate is reached, the speed of the feed pump (108) is maintained at the same speed during the electrocoagulation process. The electrocoagulation feed pump (108) is electrically connected to the control unit. The control unit automatically activates a $P^H$ sensor (110) to measure a $P^H$ of the waste water when the electrocoagulation feed pump (108) is activated. The $P^H$ sensor (110) is placed in the first flow line (106). The control unit automatically activates a first dosing pump (112) to pump acid or alkali from a $P^H$ correction tank (114) to maintain the $P^H$ of the waste water within a threshold range of 6 to 8. The control unit automatically activates the first dosing pump (112) when the measured $P^H$ of the waste water is not within the threshold range. The control unit is configured to provide power to the plurality of electrodes (402) to coagulate the waste water to remove contaminates when waste water flows from the bottom of the electrode assembly (400) to the top of the electrode assembly (400) within the electrocoagulation unit (102). The electrocoagulation unit (102) includes a first outlet valve (116) that outputs the coagulated waste water to the clarifier (120) through a second flow line (118). Alternatively, the control unit, which is thyristor-based, may be connected to a system-on-chip (SoC), one or more display units, and memory storing one or more programs configured to perform the same functions listed above and any additional functions listed below.

The electrocoagulation unit (102) includes an air grid (122) placed below the electrode assembly (400). The air grid (122) includes an internal air inlet pipe line (1222) connected to an external air inlet pipe line (1224) at connection points that lie about two air grid inlet holes (1223) on opposite sides of the nonconductive outer shell (1022) (the connection points may lie within the internal space of the nonconductive outer shell (1022) or, preferably, the connection points lie externally to the nonconductive outer shell (1022)), and a plurality of air inlet holes (1226) constructed on the internal air inlet pipe line (1222) to permit air bubbles to be introduced into the electrocoagulation unit, wherein the internal air inlet pipe line (1222) substantially traverses the lower portion of the interior space within the nonconductive outer shell (1022) such that the internal air inlet pipe line (1222) lies underneath the electrode assembly (400) (herein and hereinafter, the internal air inlet pipe line (1222) means one or more internal air inlet pipe lines (1222)). As shown in FIG. 2B, the external air inlet pipe line (1224) is located substantially outside of the nonconductive outer shell (1022). An air control valve (1228) is constructed on the external air inlet pipe line (1224) to regulate input of air into the external air inlet pipe line (1224) which then regulates the air input into the internal air inlet pipe line (1222) wherein the control unit is further configured to control the air control valve (1228), In another embodiment, as shown in FIG. 2C, the air grid includes a plurality of internal air inlet pipe lines (1222) connected to the external air inlet pipe line (1224) at connection points that lie about two sets of air grid inlet holes (1223) constructed on opposite sides of the nonconductive outer shell (1022) (the connection points may lie within the internal space of the nonconductive outer shell (1022) or, preferably, the connection points lie externally to the nonconductive outer shell (1022)), and a plurality of air inlet holes (1226) constructed on each of the plurality of internal air inlet pipe lines (1224) to permit air bubbles to be introduced into the electrocoagulation unit (102), wherein the plurality of internal air inlet pipe lines (1222) substantially traverse the lower portion of an interior space within the nonconductive outer shell (1022) such that the plurality of internal air inlet pipe lines (1222) run underneath the electrode assembly (400). The internal air inlet pipe lines (1222), of which there is a plurality, can be substantially parallel with respect to each other, be straight and bisect each other, or be in any alignment or arrangement with respect to each other that extends the longevity and maintain efficiency of the electrode array. Preferably, the internal air inlet pipe lines (1222) are substantially parallel with respect to each other. Although alternatively, the internal air inlet pipe lines (1222) of the air grid (122) are substantially orthogonal relative to the plurality of electrodes (402). An external air inlet pipe line (1224) is located substantially outside of the nonconductive outer shell (1022), an air control valve (1228) constructed on the external air inlet pipe line (1224) regulates input of air into the external air inlet pipe (1224), and by extension regulates air input into the internal air inlet pipe (1222), wherein the control unit is further configured to control the air control valve (1228)

The air grid (122) is automatically activated by the control unit at predetermined intervals for providing air purging, air bubbles introduced through the plurality of air inlet holes, to improve electrocoagulation process while the waste water is electro-coagulated inside the electrocoagulation unit (102). The automated system includes the thyristor-based control unit that is electrically connected to the electrocoagulation unit (102). The thyristor-based control unit controls a first conductor and a second conductor that provides positive and negative current to the plurality of anodes and the plurality of cathodes respectively during an electrocoagulation process. In an embodiment, a DC power is connected to a plurality of end plates and/or center plates. The plurality of plates that needs to be connected to the DC power may be determined based on waste water TDS and other parameters. The thyristor based control unit reverses the current that is supplied to the first conductor and the second conductor by polarity reversal at a predetermined time interval to remove contaminants and metallic oxides deposited on the plurality of electrodes (402) and even consumption of the plurality of electrodes (402) when the waste water is electro-coagulated inside the electrocoagulation unit (102). The polarity reversal is performed to maximize productivity, minimize downtime and reduce power consumption. The timing and frequency of polarity reversals can be predefined on the control system and the polarity reversal function is automatically performed by the control system with necessary electrical protective functions at the predefined intervals. The automated system includes a polymer dosing pump (124) that is connected to a polymer dosing tank (126). The control unit is configured to activate the polymer dosing pump (124) to provide polymer dosage on the second flow line (118) when the first outlet valve (116) outputs the coagulated waste water from the electrocoagulation unit (102). The polymer dosage mixes with the coagulated waste water to obtain a flocculated waste water.

As shown in FIG. 1, the clarifier (120) receives the flocculated waste water. The clarifier (120) settles down the solids of the flocculated waste water at the bottom to remove sludge and overflow sludge free waste water to a filter feed tank (128). The clarifier (120) may be Floatation type Dissolved Air Flotation (DAF) Clarifier, sedimentation type circular clarifier or Lamella Clarifier, HRSC Clarifier or Settling Tank etc. The clarifier (120) includes a plurality of moving fins that are constructed to skim a surface of the flocculated waste water to remove sludge from the flocculated waste water to produce sludge-free waste water. The clarifier (120) further includes a sludge outlet valve (130), a first solenoid valve (132) and a second solenoid valve (134) that are electrically controlled by the control unit. The control unit activates a sludge feed pump (135) to pump concentrated sludge to a first filter press (136) when the first solenoid valve (132) is in open position and the second solenoid valve (134) is in closed position or to a second filter press (138) when the first solenoid valve (132) is in closed position and the second solenoid valve (134) is in open position, for filtering water from the concentrated sludge. The clarifier (120) further includes a clarifier inlet valve (140) that is electrically controlled by the control unit. The control unit opens the clarifier inlet valve (140) to receive the flocculated waste water by gravity when the sludge outlet valve (130) is in closed position. The clarifier (120) further includes a clarifier outlet. The clarifier outlet outputs the sludge free waste water to a filter feed tank (128). The first filter press (136) and the second filter press (138) recirculates water filtered from the concentrated sludge for further filter pressing and outputs treated water to the filter feed tank (128).

The pressure sand filter (142) and the activated carbon filter and/or iron removal filter (CIRF) (144) receives the sludge free waste water. The pressure sand filter (142) and the activated carbon filter and/or iron removal filter (144) filters suspended solids and colloidal from the sludge free waste water and outputs (i) a carbon or IRF filtered water to an ultrafiltration (UF) feed tank (202) and (ii) a backwashed waste water to the collection tank (104). The pressure sand filter (142) includes a tank filled with layers of sand with the layers ordered by decreasing grain size from an upper portion of the tank to a lower portion of tank. The pressure sand filter (142) further includes the tank which includes an external shell having an internal region constructed to hold sand of varying grain size, a receiving adapter constructed on an upper region of the external shell such that the receiving adapter connects the third flow line to the pressure sand filter, a pressure sand filter-backwash pump (1422) preferably located outside of the pressure sand filter (142). The pressure sand filter-backwash pump (1442) may be located outside at a lower region of the external shell to backwash sand filtered water from a lower internal region of the external shell to an upper internal region of the external shell to purge obstructive material from the pressure sand filter. The pressure sand filter backwash pump (1422) is controlled by the control unit, wherein the pressure sand filter backwash pump (1422), at a user-defined interval, pumps water that has been filtered through the pressure sand filter (142) back into the pressure sand filter. This backwash loosens and helps clear solids that may be trapped in the intervening layers of sand, where these trapped solids reduce the effectiveness of the pressure sand filter (142). Such a reduction can reduce the frequency in replacing the contents of the tank of the pressure sand filter (142). The automated system further includes a filter feed pump (146) that is connected to the filter feed tank (128). The control unit activates the filter feed pump (146) to pump the sludge free waste water from the filter feed tank (128) to the pressure sand filter (142) and the activated carbon filter and/or iron removal filter (144) at a second flow rate. The control unit gradually increases the second flow rate over a period of time to increase a flow of the sludge free waste water. The automated system includes an air blower (105) that is electrically connected to the control unit. The control unit automatically activates the air blower (105) to agitate the waste water inside the collection tank (104) at first predefined intervals.

The automated system includes an electrocoagulation cleaning unit (148) that automatically cleans the electrocoagulation unit (102) at predefined time intervals. The electrocoagulation cleaning unit (148) is electrically connected to the control unit. The electrocoagulation cleaning unit includes a first drain valve (150) that is electrically controlled by the control unit. The control unit opens the first drain valve (150) to drain the waste water that is remaining in the electrocoagulation unit (102) to the collection tank (104) for cleaning when the first inlet valve (107) is in closed position. As shown in FIG. 2b, the electrocoagulation cleaning unit (148) includes a fresh water inlet valve (152) that is electrically controlled by the control unit. The control unit opens the fresh water inlet valve (152) to provide fresh water to the electrocoagulation unit (102) for removing solid particles when the first inlet valve (107), the first outlet valve 116, the first drain valve (150) are in closed position. The fresh water is pumped from a fresh water tank to the electrocoagulation unit (102) using a fresh water feed pump. The air grid (122) provides air inside the electrocoagulation unit (104) at predefined time interval to remove the solid particles between the plurality of electrodes (402) during fresh water cleaning. The control unit opens the first drain valve (150) to drain the waste water inside the electrocoagulation unit (102) after fresh water cleaning.

Figure 5:
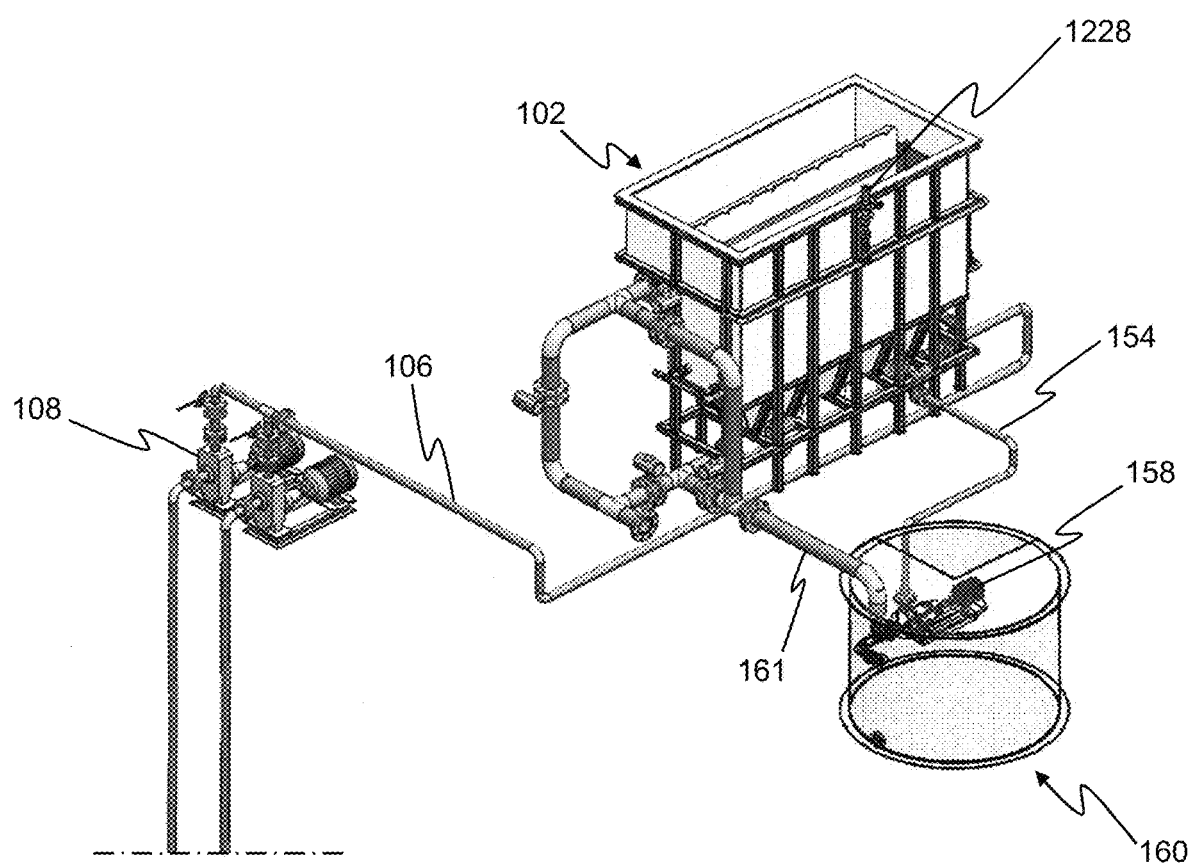
FIG. 5 illustrates a perspective view of the electrocoagulation unit of the automated waste water recycling system of FIGS. 1, 3, and 4 connected to an acid wash.

As shown in FIG. 2B, the electrocoagulation cleaning unit (148) includes an acid inlet valve (154) that is electrically controlled by the control unit. For the acid wash, the control unit opens the acid inlet valve (154) to provide acid to remove all debris present in between the plurality of electrodes (402) of the electrocoagulation unit (102) when the first inlet valve (107), the first outlet valve (116), the first drain valve (150), the fresh water inlet valve (152) and an acid outlet valve (156) are in closed position. The acid is soaked inside the electrocoagulation unit (102) for a predetermined time period to remove the debris and metal oxides present in between the plurality of electrodes (402) when the acid inlet valve (154) and the acid outlet valve (156) are in closed position. The electrocoagulation cleaning unit (148) includes an acid cleaning pump (158) that is electrically connected to the control unit. As shown in FIG. 5, the acid cleaning pump (158) automatically pumps cleaning chemicals from an EC chemical storage tank (160) to the electrocoagulation unit (102) through the acid inlet valve (154) at a predetermined time interval when the first inlet valve (107), the first outlet valve (116), the first drain valve (150), the fresh water inlet valve (152) and the acid outlet valve (156) are in closed position.

The acid outlet valve (156) is electrically connected to the control unit. The control unit automatically opens the acid outlet valve (156) to drain the acids after cleaning to the EC chemical storage tank (160) through a cleaning outlet (161) at a predetermined time interval when the acid inlet valve (154), the first inlet valve (107), the first outlet valve (116) and the first drain valve (150) are in closed position. The control unit automatically opens the fresh water inlet valve (152) again to provide the fresh water for subsequent fresh water cleaning of the electrocoagulation unit (102) at a predetermined time interval when the first inlet valve (107), the first outlet valve (116), the first drain valve (150), the acid inlet valve (154) and the acid outlet valve (156). The control unit opens the first drain valve (150) to drain acid from the electrocoagulation unit (102) to the collection tank 104 after a predetermined number of acid cleanings. In an embodiment, any of the above mentioned valves may be a ball valve or butterfly valve controlled by a solenoid valve or an electric valve or a pneumatic actuator.

Figure 3:
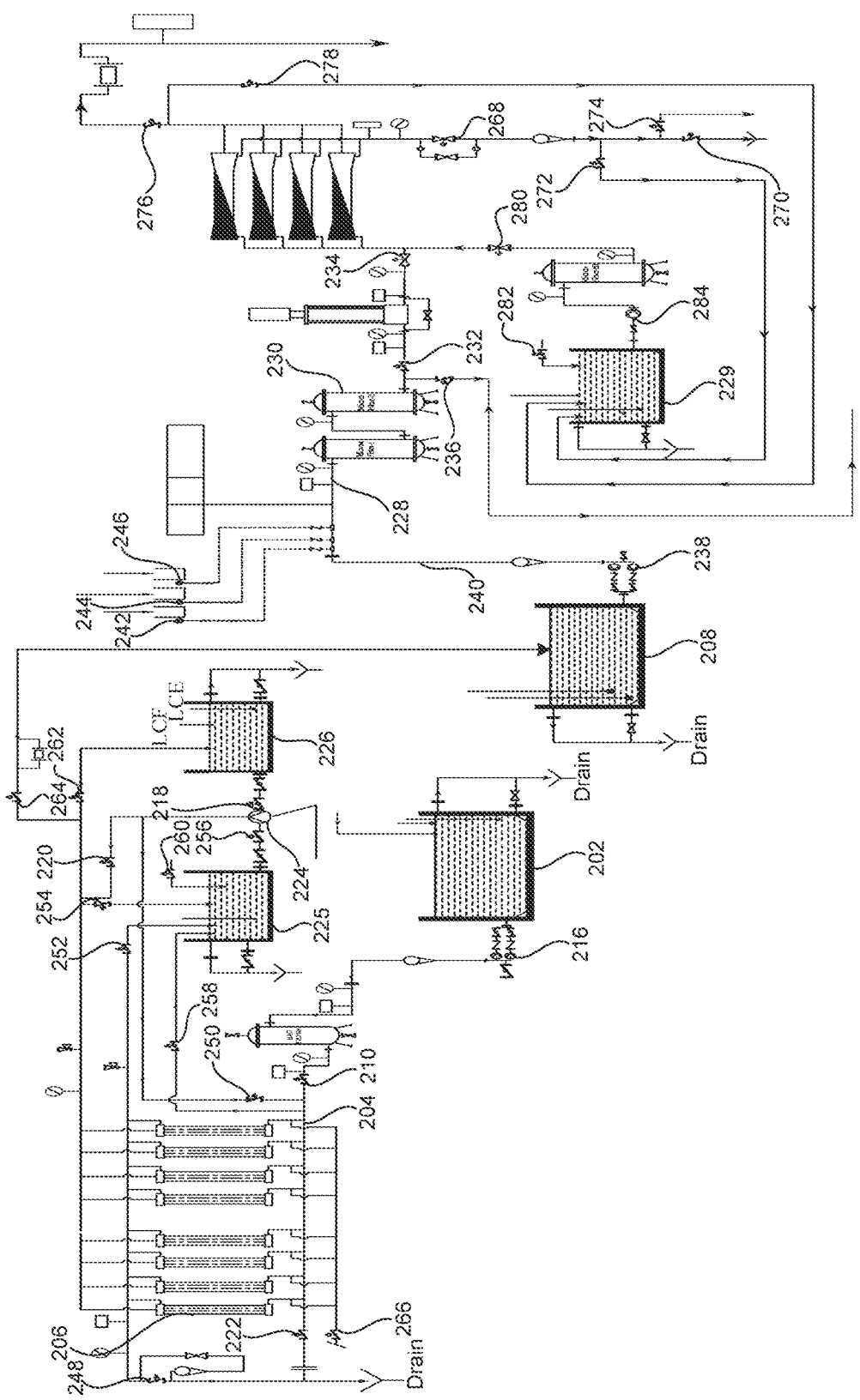
FIG. 3 illustrates a system view of the automated waste water recycling system of FIG. 1 further comprising an ultrafiltration system and a first reverse osmosis (RO) system.
Figure 4:
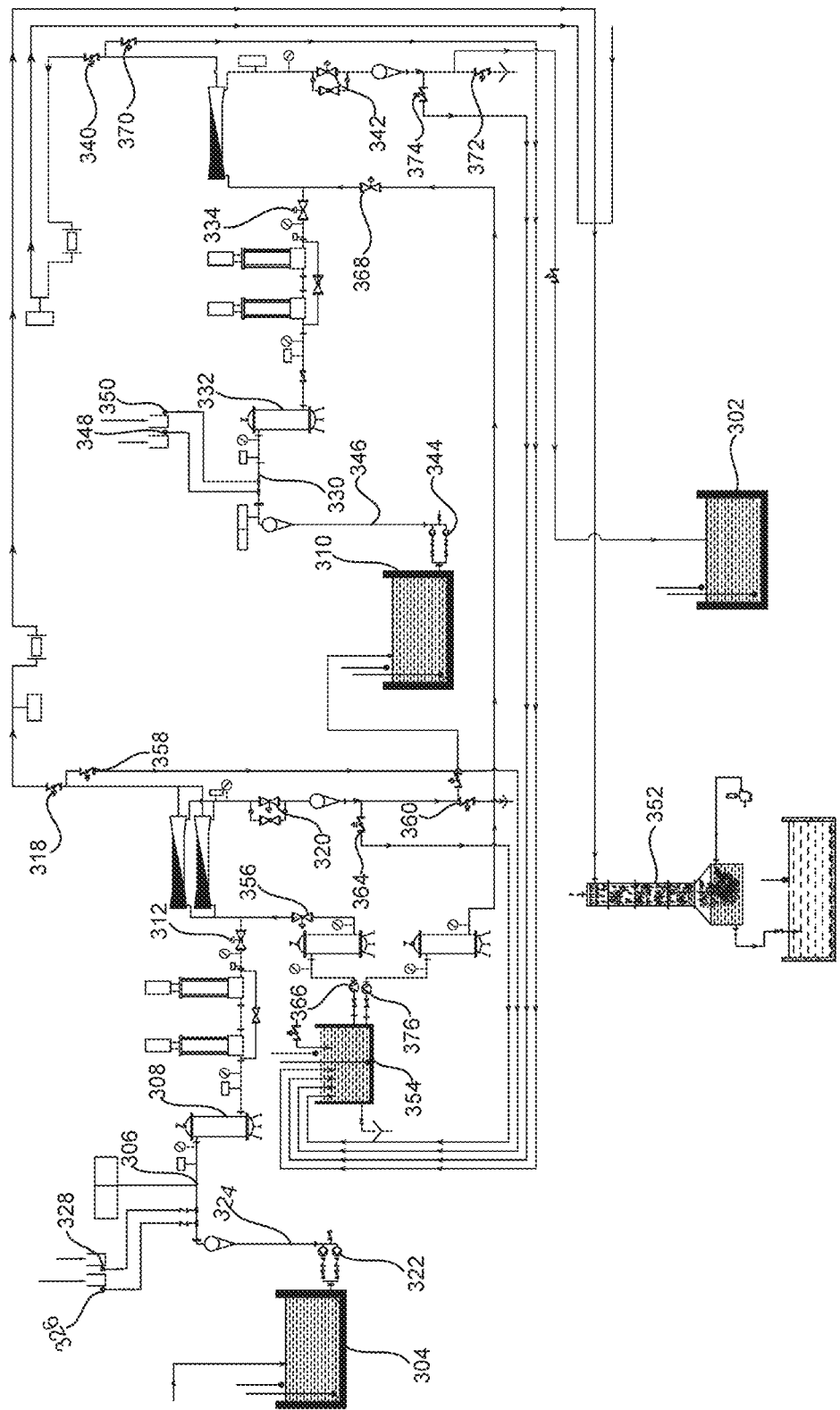
FIG. 4 illustrates a system view of the automated waste water recycling system of FIG. 3 further comprising a second reverse osmosis (RO) system and a third reverse osmosis (RO) system.

FIG. 3 illustrates a system view of the automated waste water recycling system (100) comprising an ultrafiltration (UF) system (204) and a first reverse osmosis (RO) (228) system according to an embodiment herein. The UF system (204) filters the carbon or IRF filtered water using a plurality of first filters (206) to remove colloidal particles, viruses, or large molecules and outputs a UF treated water to a first reverse osmosis (RO) feed tank (208). The plurality of first filters may be a membrane filters or spiral wound sheet type membrane or hollow fiber membrane. The UF system (204) further includes an UF inlet valve (210), an UF drain valve (212) and an UF service outlet valve (214) that are electrically controlled by the control unit. The automated system further includes a UF feed pump (216) that is connected to the UF feed tank (202). The control unit controls the UF feed pump (216) to pump the carbon or IRF filtered water from the UF feed tank (202) at a third flow rate when the UF inlet valve (210) is in open condition and the UF drain valve (212) and the UF service outlet valve (214) is in closed position. The control unit gradually increases the third flow rate over a period of time to increase a flow of the carbon or IRF filtered water to the UF system (204). The UF system (204) further includes a UF backwash feed valve (218), a UF backwash inlet valve (220), and a UF bottom drain valve (222) that are electrically controlled by the control unit. The control unit activates a UF backwash pump (224) to pump backwashed waste water from a backwash tank (226) when the UF inlet valve (210), the UF drain valve (212), the UF service outlet valve (214) and the UF bottom drain valve (222) are in closed position and when the UF backwash feed valve (218), the UF backwash inlet valve (220) are in open position. The UF backwash feed valve (218), the UF backwash inlet valve (220), and the UF bottom drain valve (222) are closed after a predetermined time period. The first RO system (228) that receives the UF treated water from the first reverse osmosis (RO) feed tank (208). The first RO system (228) filters the UF treated water using a plurality of second filters (230) to remove ions, molecules and larger particles and outputs a first RO permeate water to a RO permeate/production tank and a first RO reject water to a second reverse osmosis (RO) feed tank. The plurality of second filters may be a RO filter, spiral wound brackish water or sea water membranes, or low fouling RO membranes and circular disc membranes.

The first RO system (228) includes a first RO feed valve (232), a first RO inlet valve (234) and an Oxidation Reduction potential (ORP) drain valve (236) that are electrically controlled by the control unit. The control unit activates a first RO feed pump (238) to pump the UF treated water from the first reverse osmosis (RO) feed tank (208) at a fourth flow rate through a third flow line (240) when the first RO feed valve (232) and the RO first inlet valve (234) are in open position and when the ORP drain valve (236) is in closed position. The automated system includes a first acid dosing pump (242) that is automatically activated using the control unit when a $P^H$ of the UF treated water is not within a threshold range to provide required acid dosage to the UF treated water in the third flow line (240). The automated system includes a first anti-oxidant dosing pump (244) to provide required anti-oxidant dosage to the UF treated water in the third flow line (240) and a first anti-scalant dosing pump (246) to provide required anti-scalant dosage to the UF treated water in the third flow line (240). The control unit gradually increases the fourth flow rate over a period of time.

The UF system (204) includes a UF cleaning unit. The UF cleaning unit includes a UF chemical feed valve (256), a UF reject to drain valve (248), a UF flushing inlet valve (250) and a UF permeate to cleaning tank (CT) valve (254) that are electrically controlled by the control unit. The control unit activates a UF backwash pump (224) to pump cleaning chemicals such as organic and inorganic acids, alkalis and chlorine based cleaning chemicals from a UF chemical storage tank (225) through the UF chemical feed valve (256) and rinse acids at the UF system (204) for cleaning when the UF chemical feed valve (256), the UF reject to drain valve (248), the UF flushing inlet valve (250) and the UF permeate to CT valve (254) are in open position, a UF chemical recirculation valve (252) that is electrically controlled by the control unit. The control unit activates the UF backwash pump (224) to recirculate acids to the UF system (204) for subsequent cleaning at predefined intervals when the UF chemical recirculation valve, the UF chemical feed valve (256), the UF reject to drain valve (248), the UF flushing inlet valve (250) and the UF permeate to CT valve (254) are in open position.

The first RO system (228) includes a first RO cleaning unit (229). The first RO cleaning unit (229) includes a first RO cleaning inlet valve (280), a first RO permeate to cleaning tank valve (278), a first RO reject drain valve (270), a first RO reject valve (268) and a first RO circulation valve (272) that are electrically controlled by the control unit. The control unit activates a first RO cleaning pump (284) to flush cleaning chemicals such as organic and inorganic acids, alkalis and chlorine based cleaning chemicals into the first RO system (228) from a first RO cleaning system (229) when the first RO cleaning inlet valve (280), the first RO permeate to cleaning tank valve (278) and the first RO reject drain valve (270) are in open position and the first RO reject valve (268) is in closed position. When the first RO cleaning inlet valve (280), the first RO permeate to cleaning tank valve (278) and the first RO circulation valve (272) are in open position and when the first RO reject valve (268) is closed position, the control unit activates the first RO cleaning pump (284) to recirculate the cleaning chemicals into the first RO system (228) through the first RO circulation valve (272) for further cleaning. In an embodiment, any of the above mentioned valves may be a solenoid valve or an electronic valve.

FIG. 3 illustrates a system view of the automated waste water recycling system (100) comprising a second reverse osmosis (RO) system (306) and a third reverse osmosis (RO) system (330) according to an embodiment herein. The second RO system (306) that receives the first RO reject water from the second reverse osmosis (RO) feed tank (304). The second RO system (306) filters the first RO reject water using a plurality of third filters (308) to remove further ions, molecules and larger particles and outputs a second RO permeate water to the evaporation tank (302) and a second RO reject water to a third reverse osmosis (RO) feed tank (310).

The second RO system (306) further includes a second RO feed valve (312), a second RO permeate valve (318) and a second RO reject valve (320) that are electrically controlled by the control unit. The control unit activates a second RO feed pump (322) to pump the first RO reject water from the second reverse osmosis (RO) feed tank (304) through a fourth flow line (324) at a fifth flow rate when the second RO feed valve (312), the second RO permeate valve (318) are in open position and the second RO reject valve (320) is not in fully closed position. The control unit activates a second acid dosing pump (326) when a $P^H$ of the first RO reject water is not within a threshold range, a second anti-oxidant dosing pump and a second anti-scalant dosing pump (328) to provide required acid dosage, anti-oxidant dosage and anti-scalant dosage respectively to the first RO reject water in the fourth flow line (324). The control unit gradually increases the fifth flow rate over a period of time. The second RO feed valve (312), and the second RO permeate valve (318) are closed and the second RO reject valve (320) is opened after a predefined time period.

The third RO system (330) receives the second RO reject water from the third reverse osmosis (RO) feed tank (310). The third RO system (330) filters the second RO reject water using a plurality of fifth filters (332) to remove further ions, molecules and larger particles and outputs a third RO permeate water to the RO permeate/production tank (354) and a third RO reject water to an evaporation tank (302). The third RO system (330) further includes a third RO feed valve (334), a third RO permeate valve (340) and a third RO reject valve (342) that are electrically controlled by the control unit. The control unit activates a third RO feed pump (344) to pump the second RO reject water from the third reverse osmosis (RO) feed tank (310) through a fifth flow line (346) at a sixth flow rate when the third RO feed valve (334), the third RO permeate valve (340) are in open position and the third RO reject valve (342) is in closed position. The control unit activates a third acid dosing pump (348) when a $P^H$ of the second RO reject water is not within a threshold range, a third anti-oxidant dosing pump, and a third anti-scalant dosing pump (350) to provide required acid dosage, and anti-oxidant dosage and anti-scalant dosage respectively to the second RO reject water in the fifth flow line (346). The control unit gradually increases the sixth flow rate over a period of time. The third RO feed valve (334), and the third RO permeate valve (340) are closed and the third RO reject valve (342) is opened after a predefined time period. In an embodiment, the automated system includes a fourth RO system for subsequent purification/purification of a third RO reject water. The automated system further comprises a fourth RO system that receives the third RO reject water from the fourth reverse osmosis (RO) feed tank. The fourth RO system filters the third RO reject water using a plurality of sixth filters to remove further ions, molecules and larger particles and outputs a fourth RO permeate water to the RO permeate/production tank (354) and a fourth RO reject water to multiple effect evaporator system.

The fourth RO system comprises a fourth RO feed valve, a fourth RO inlet valve, a fourth RO permeate valve and a fourth reject valve that are electrically controlled by the control unit, wherein the control unit activates a fourth RO feed pump to pump the third RO reject water from the fourth reverse osmosis (RO) feed tank through a sixth flow line at a seventh flow rate when the fourth RO feed valve, the fourth RO inlet valve, the fourth RO permeate valve are in open position and the fourth reject valve is in closed position, wherein the control unit activates a fourth acid dosing pump when a $P^H$ of the third RO reject water is not within a threshold range, a fourth anti-oxidant dosing pump, and a fourth anti-scalant dosing pump to provide required acid dosage, and anti-oxidant dosage and anti-scalant dosage respectively to the third RO reject water in the sixth flow line, wherein the control unit gradually increases the seventh flow rate over a period of time, wherein the fourth RO feed valve, the fourth RO inlet valve and the fourth RO permeate valve are closed and the fourth reject valve is opened after a predefined time period.

The automated system comprises an evaporator that receives a reject slurry of the multiple effect evaporator system of third RO system (330) or fourth RO system and further evaporated and outputs evaporator condensate to the production tank (354) and evaporator reject water to an agitated thin film drier. The agitated thin film drier converts the evaporator reject water to solids. The second RO system (306) includes a second RO cleaning unit (354) that further includes a second RO cleaning inlet valve (356), a second RO permeate to cleaning tank valve (358), a second RO reject drain valve (360), wherein the second RO reject valve (320) and a second RO circulation valve (364) that are electrically controlled by the control unit. The control unit activates a second RO cleaning pump (366) to flush cleaning chemicals into the second RO system (306) from the second RO cleaning system (354) when the second RO cleaning inlet valve (356), the second RO permeate to cleaning tank valve (358) and the second RO reject drain valve (360) are in open position. When the second RO cleaning inlet valve (356), the second RO permeate to cleaning tank valve (358) and the second RO circulation valve (364) are in opened and when the second RO reject valve (320) is closed position, the control unit activates the second RO cleaning pump (366) to recirculate cleaning chemicals into the second RO system (306) through the second RO circulation valve (364) for further cleaning. In an embodiment, any of the above mentioned valves may be a ball valve or a butterfly valve controlled by a solenoid valve or any electronic valve or a pneumatic actuator.

The third RO system (330) includes a third RO cleaning unit that includes a third RO cleaning inlet valve (368), a third RO permeate to cleaning tank valve (370), a third RO reject drain valve (372), said third RO reject valve (342) and a third RO circulation valve (374) that are electrically controlled by the control unit. The control unit activates a third RO cleaning pump (376) to flush cleaning chemicals into the third RO system (330) from the second RO cleaning system (354) when the third RO cleaning inlet valve (368), the third RO permeate to cleaning tank valve (370) and the third RO reject drain valve (372) are in open position. When the third RO cleaning inlet valve (368), the third RO permeate to cleaning tank valve (370) and the third RO circulation valve (374) are in opened and when the third RO reject valve (342) is closed position, the control unit activates the third RO cleaning pump (376) to recirculate cleaning chemicals into the third RO system through the third RO circulation valve (374) for further cleaning.

FIGS. 2A-B illustrate perspective views of the electrocoagulation unit (102) of the FIG. 1 according to an embodiment herein. The electrocoagulation unit (102) includes a hoist (420), a lifting arrangement (404), a plurality of holders (406) and a plurality of electrodes (402). The hoist (420) controls the lifting arrangement (404) to place the plurality of electrodes (402) inside the electrocoagulation unit (102). The lifting arrangement (404) is coupled to the plurality of holders (406) for lifting the plurality of electrodes (402). The plurality of holders (406) tightly holds the plurality of electrodes (402) and the lifting arrangement (404) further allows the plurality of electrodes (402) to rest substantially within the electrocoagulation unit (102).

Figure 6A:
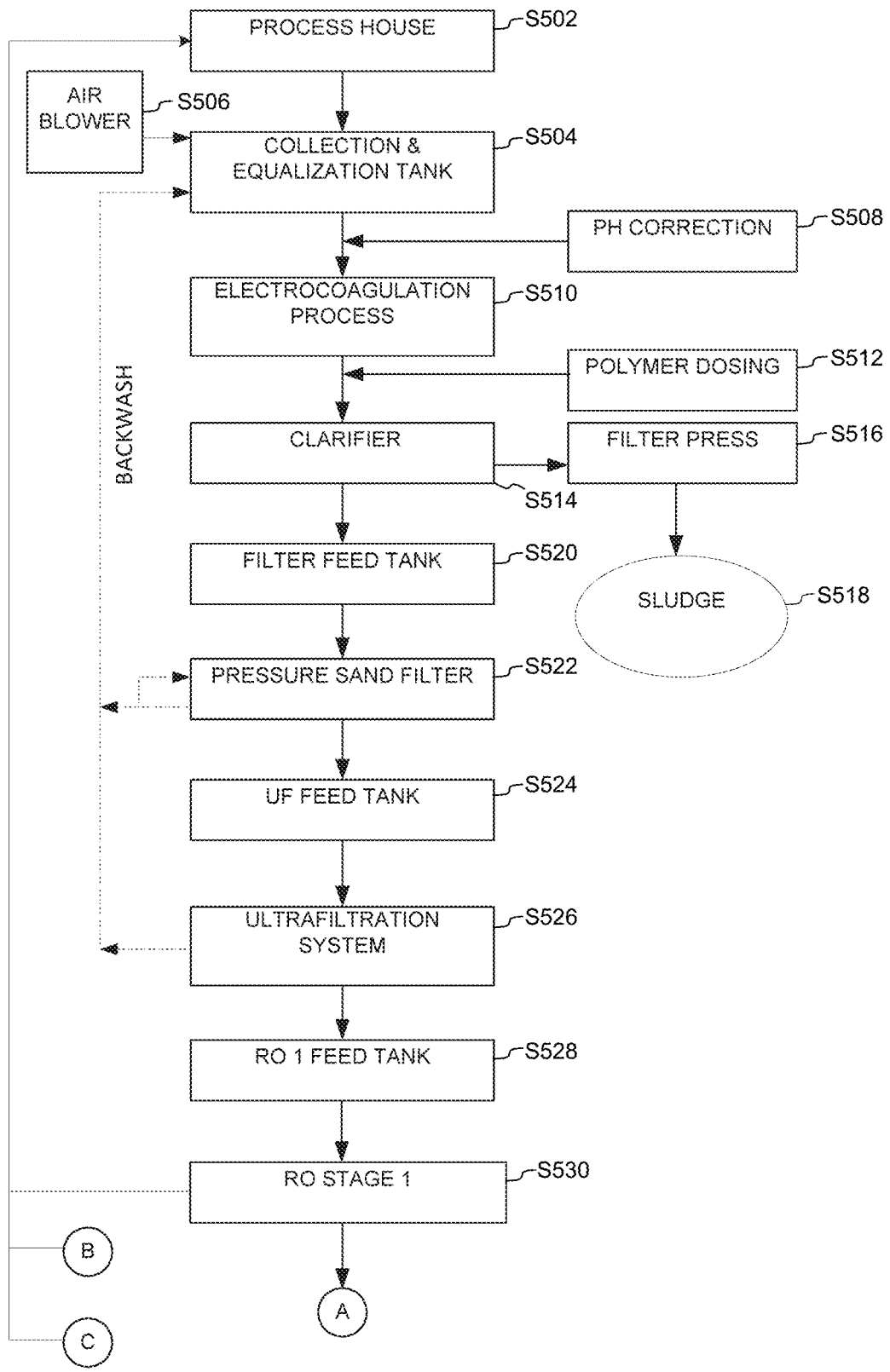
FIGS. 6A and 6B illustrates a process of treating waste water using the automated waste water recycling system of FIG. 4 according to an embodiment herein.
Figure 6B:
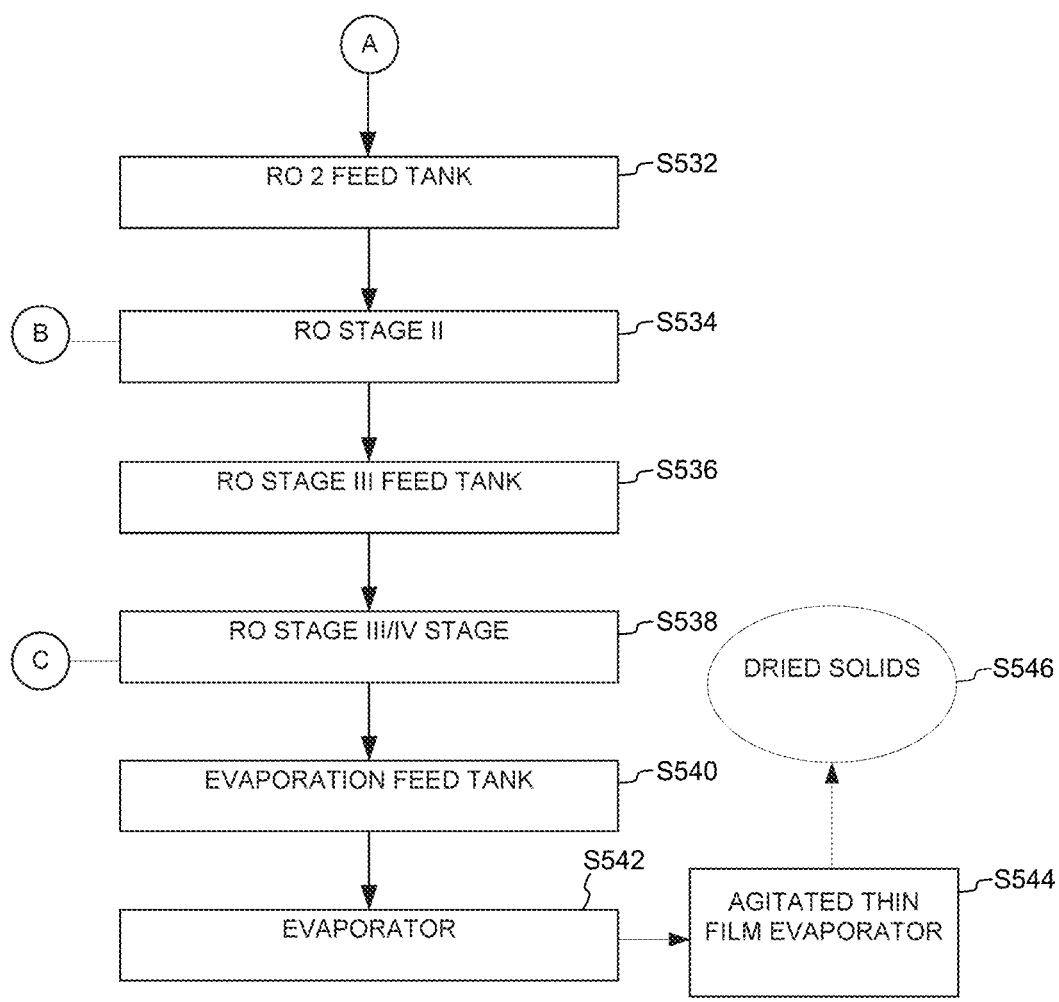

FIGS. 6A and 6B illustrates a process of treating waste water using the automated waste water recycling system (100) of FIG. 1 according to an embodiment herein. At step S502, an industrial process is performed in a process house. At step S504, the collection/equalization tank (104) collects the waste water from the process house for filtering. At step S506, the air blower (105) agitates the waste water inside the collection tank (104) at predefined intervals. At step S508, a $P^H$ sensor (110) is automatically activated to measure a $P^H$ of the waste water when the electrocoagulation feed pump (108) is activated. The $P^H$ sensor (110) is placed in the first flow line (106) and the control unit automatically activates the first dosing pump (112) to pump acid or alkali from a $P^H$ correction tank (114) to maintain the $P^H$ of the waste water within a threshold range of 6 to 8 when the measured $P^H$ of the waste water is not within the threshold range.

At step S510, the electrocoagulation (EC) unit (102) is connected to the collection tank (104) through a first flow line (106) for receiving waste water. The control unit activates the electrocoagulation feed pump (108) to pump said waste water through the first flow line (106) from the collection tank (104) to the electrocoagulation unit (102) at a first flow rate. At step S512, the polymer dosing pump (124) is connected to the polymer dosing tank (126). The control unit is configured to activate the polymer dosing pump (124) to provide polymer dosage. At step S514, the clarifier (120) receives the flocculated waste water. The clarifier (120) removes the flocculated solids either by sedimentation or floatation from the flocculated waste water and outputs sludge free waste water to the filter feed tank (128). At step S516, the control unit activates the sludge feed pump (135) to pump concentrated sludge to the first filter press (136) when the first solenoid valve (132) is in open position and the second solenoid valve (134) is in closed position or to the second filter press (138) when the first solenoid valve (132) is in closed position and the second solenoid valve (134) is in open position, for filtering water from the concentrated sludge. At step S518, the first filter press and the second filter press remove the sludge from the concentrated sludge and treated water out to the filter feed tank (128). At step S520, the filter feed pump (146) pumps the sludge free waste water from the filter feed tank (128) to the pressure sand filter (142) and the activated carbon filter and/or iron removal filter (144). At step S522, the pressure sand filter (142) and the activated carbon filter and/or iron removal filter (CIRF) (144) receive the sludge free waste water. The pressure sand filter (142) and the activated carbon filter and/or iron removal filter (144) filter suspended solids and colloidal from the sludge free waste water and outputs (i) a carbon or IRF filtered water to an ultrafiltration (UF) feed tank (202) and (ii) a backwashed waste water to the collection tank (104). At step S523, the control unit, at user-defined interval(s), activates the pressure sand filter backwash pump (1422) to pump sand-filtered water in a reverse direction to backwash the pressure sand filter such that the sand-filtered water travels from the bottom of the pressure sand filter towards the top of the pressure sand filter in order to dislodge and remove solid matter from pressure sand filter. This backwash of the pressure sand filter not only prolongs the longevity of the pressure sand filter but also allows the pressure sand filter to operate at a higher efficiency. At step S524, the UF feed pump (216) pumps the carbon or IRF filtered water from the UF feed tank (202) to the UF system (204).

At step S526, the UF system (204) filters the carbon or IRF filtered water using the plurality of first filters (206) to remove colloidal particles, viruses, or large molecules and outputs a UF treated water to the first reverse osmosis (RO) feed tank (208). At step S528, the first RO system (228) receives the UF treated water from the first reverse osmosis (RO) feed tank (208). At step S530, the first RO system (228) filters the UF treated water using a plurality of second filters (230) to remove ions, molecules and larger particles and outputs a first RO permeate water to the RO permeate/production tank (354) and a first RO reject water to the second reverse osmosis (RO) feed tank (304). At step S532, the second RO system (306) receives the first RO reject water from the second reverse osmosis (RO) feed tank (304). At step S534, the second RO system (306) filters the first RO reject water using a plurality of third filters (308) to remove further ions, molecules and larger particles and outputs a second RO permeate water to the RO permeate tank or production tank (354) and a second RO reject water to the third reverse osmosis (RO) feed tank (310). At step S536, the third RO system (330) receives the second RO reject water from the third reverse osmosis (RO) feed tank (310). At step S538, the third RO system (330) filters the second RO reject water using a plurality of fifth filters (332) to remove further ions, molecules and larger particles and outputs a third RO permeate water to the RO permeate tank or production tank (354) and a third RO reject water to an evaporation tank (302). At step S540, the evaporation tank collects the final stage RO reject (Third RO or Fourth RO) water. At step S542, the evaporator (352) receives the third RO reject water or fourth RO reject water from the evaporation tank (302). The evaporator (352) that receives a reject of third RO system (330) or fourth RO system and further evaporated third RO reject water or fourth RO reject water to recover condensate water as reusable water in a RO permeate/production tank (354). At step S544, the agitated thin film drier converts the evaporator reject slurry to solids. At step S546, the dried solids are outputted from the automated waste water recycling system.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:
1. An automated waste water treatment system comprising:
    a collection tank constructed to hold waste water;
    a first flow line connected to the collection tank to output the waste water from the collection tank;
    an electrocoagulation unit connected to the first flow line to receive the waste water and to output the waste water as coagulated waste water into a second flow line;
    a polymer dosage tank to provide a polymer dosage into the second flow line wherein the polymer dosage mixes with the coagulated waste water to produce and output flocculated waste water;
    a clarifier connected to the second flow line to receive the flocculated waste water and to produce sludge-free waste water and concentrated sludge;
    a filter feed tank to receive the sludge-free water from the clarifier;
    a filter press to produce treated water from the concentrated sludge;
    a pressure sand filter constructed to receive the sludge-free waste water and the treated water and outputs to a activated carbon filter and/or iron removal filter (CIRF); and
    an ultrafiltration system that receives CIRF-filtered water and outputs ultrafiltration-treated water to a reverse osmosis system,
    wherein a first inlet valve regulates the waste water flowing into the electrocoagulation unit, and
    wherein the electrocoagulation unit includes:
        a nonconductive outer shell having an interior space;
        a control unit electrically connected to the electrocoagulation unit;
        an electrocoagulation feed line connected to the first flow line, the electrocoagulation feed line including a plurality of electrocoagulation feed pipes connected to a bottom surface of the nonconductive outer shell to feed the waste water received from the first flow line into a lower portion of the interior space;

an air grid controlled by the control unit; and
an electrode assembly placed substantially within the nonconductive outer shell, the electrode assembly including a plurality of electrodes exposed to an upward flow of the waste water from the lower portion of the interior space, a plurality of holders to hold the plurality of electrodes, and an electrode lifting arrangement on a top edge of each of the plurality of electrodes,
wherein the plurality of electrocoagulation feed pipes are spaced with respect to each other to allow the waste water to enter the lower portion of the interior space of the electrocoagulation unit evenly, and
wherein the air grid purges waste material from the plurality of electrodes.

2. The automated waste water treatment system of claim 1, wherein the control unit is configured to: regulate activation and speed of an electrocoagulation feed pump that pumps the waste water into the first flow line from the collection tank, automate activation of a pH sensor to measure a pH of the waste water upon activation of the electrocoagulation feed pump, automate activation of a first dosing pump to pump acid or alkali from a pH correction tank such that the pH of the waste water is maintained within a threshold range between 6 to 9, and regulate acid cleaning of the plurality of electrodes wherein an electrocoagulation chemical storage tank provides acid to the electrocoagulation unit at a predetermined time interval to acid wash the plurality of electrodes.

3. The automated waste water treatment system of claim 1, wherein the air grid comprises:
a plurality of internal air inlet pipe lines connected to an external air inlet pipe line via a plurality of air grid inlet holes constructed on the nonconductive outer shell; and
a plurality of air inlet holes constructed on each of the plurality of internal air inlet pipe lines to permit air bubbles to be introduced into the electrocoagulation unit,
wherein the plurality of internal air inlet pipe lines substantially traverse the lower portion of an interior space within the nonconductive outer shell such that the plurality of internal air inlet pipe lines run underneath the electrode assembly,
wherein the external air inlet pipe line substantially located outside of the nonconductive outer shell, and
wherein an air control valve is constructed to regulate input of air into the external air inlet pipe wherein the control unit is configured to control the air control valve.

4. The automated waste water treatment system of claim 3, wherein the plurality of internal air inlet pipe lines are substantially parallel to each other.

5. The automated waste water treatment system of claim 3, wherein the plurality of internal air inlet pipe lines are substantially straight and may bisect each other.

6. The automated waste water treatment system of claim 3, wherein the electrocoagulation unit further comprises:
a top rim constructed at a topmost boundary of the nonconductive outer shell; and
a partition wall constructed in the interior space of the nonconductive outer shell such that the partition wall divides an electrode chamber and an outlet chamber;
the second flow line having a first end connected to a bottom of the outlet chamber and a second end connected to a clarifier; and
a first outlet valve that outputs the coagulated waste water from the receiving tray to the first end of the second flow line,
wherein the partition wall includes a top edge constructed at a height below the top rim,
wherein the electrode assembly is received substantially within the electrode chamber and wherein the electrode lifting arrangement rests atop the top edge of the partition wall, and
wherein the coagulated waste water passively spills over the top edge of the partition wall from the electrode chamber to the outlet chamber.

7. The automated waste water treatment system of claim 6, the automated waste water treatment system further comprising:
a polymer dosing tank that stores the polymer dosage; and
a polymer dosing pump constructed to pump the polymer dosage from the polymer dosing tank to the second flow line such that the polymer dosage mixes with the coagulated waste water to produce the flocculated waste water.

8. The automated waste water treatment system of claim 7, wherein the second flow line feeds the flocculated waste water into the clarifier, and
wherein the clarifier comprises:
a clarifier inlet valve constructed to connect the second flow line to the clarifier;
a plurality of clarifier filters within the clarifier wherein the plurality of clarifier filters are constructed to remove sludge from the flocculated waste water to output the sludge-free waste water;
a clarifier outlet constructed to output the sludge-free waste water from the clarifier; and
a sludge outlet valve regulated by the control unit to output the concentrated sludge from the clarifier,
wherein the clarifier inlet valve is regulated by the control unit such that the control unit opens the clarifier inlet valve to receive the flocculated waste water by gravity when the sludge outlet valve is closed.

9. The automated waste water treatment system of claim 8, the automated waste water treatment system further comprising:
a sludge feed pump regulated by the control unit wherein the sludge feed pump pumps the concentrated sludge from the clarifier through the sludge outlet valve when the sludge outlet valve is opened,
wherein the filter press includes a first filter press and a second filter press,
wherein the first filter press is constructed to produce the treated water from the concentrated sludge, and
wherein the second filter press is constructed to produce the treated water from the concentrated sludge.

10. The automated waste water treatment system of claim 9, wherein the first filter press and the second filter press recirculate water from the concentrated sludge for further filter pressing and outputs the water as the treated water to the filter feed tank.

11. The automated waste water treatment system of claim 10, wherein the clarifier further comprises:
a first solenoid valve regulated by the control unit; and
a second solenoid valve regulated by the control unit,
wherein the first filter press receives the concentrated sludge from the clarifier when the control unit activates the sludge feed pump, opens the sludge outlet valve, and opens the first solenoid valve, wherein the second filter press receives the concentrated sludge from the clarifier when the control unit activates the sludge feed pump, opens the sludge outlet valve, and opens the second solenoid valve, and wherein, from the concentrated sludge, each of the first filter press and the second filter press outputs the treated water to the filter feed tank and outputs the concentrated sludge to a rejection tank.

12. The automated waste water treatment system of claim 11, the automated waste water treatment system further comprising:
   a filter feed pump regulated by the control unit wherein the filter feed pump is connected to the filter feed tank to pump the sludge-free waste water from the filter feed tank to the pressure sand filter;
   the pressure sand filter constructed to receive the sludge-free waste water and the treated water from the filter feed tank and to output sand-filtered water; and
   the CIRF constructed to receive sand-filtered water from the pressure sand filter and to output CIRF-filtered water to a ultrafiltration feed tank and output backwashed waste water to the collection tank for further electrocoagulation and filtering, and
   wherein the pressure sand filter comprises:
      a pressure sand filter-backwash pump controlled by the control unit to pump the sand-filtered water from a lower region of the pressure sand filter to an upper region of the pressure sand filter to purge obstructive material from the pressure sand filter.

13. The automated waste water treatment system of claim 12, wherein the automated waste water treatment system further comprises:
   the ultrafiltration system that receives the CIRF-filtered water using a plurality of first filters to remove colloidal particles, viruses, or large molecules and outputs the ultrafiltration-treated water to a first reverse osmosis feed tank; and
   the reverse osmosis system that receives the ultrafiltration-treated water from the ultrafiltration system outputs reverse osmosis-treated water, the reverse osmosis system comprising:
      the first osmosis feed tank that receives the ultrafiltration-treated water and outputs reverse osmosis-treated water; and
      a second reverse osmosis feed tank to receive reverse osmosis-treated water for further filtration of the reverse osmosis-treated water by reverse osmosis.

14. The automated waste water treatment system of claim 2, wherein the control unit is further configured to regulate the control valve to permit air to pass through the plurality of air inlet holes at a predetermined interval of time.

15. The automated waste water treatment system of claim 1, wherein the lifting arrangements are detachably attached to a hoist such that the hoist can be raised the plurality of electrodes for maintenance.

* * * * *